March 10, 1970 M. D. ABBOTT ET AL 3,499,733
AUTOMATIC TITRATOR
Filed Feb. 13, 1967 2 Sheets-Sheet 1

INVENTOR.
M.D. ABBOTT
J.C. WORD, JR
BY
Young & Quigg
ATTORNEYS

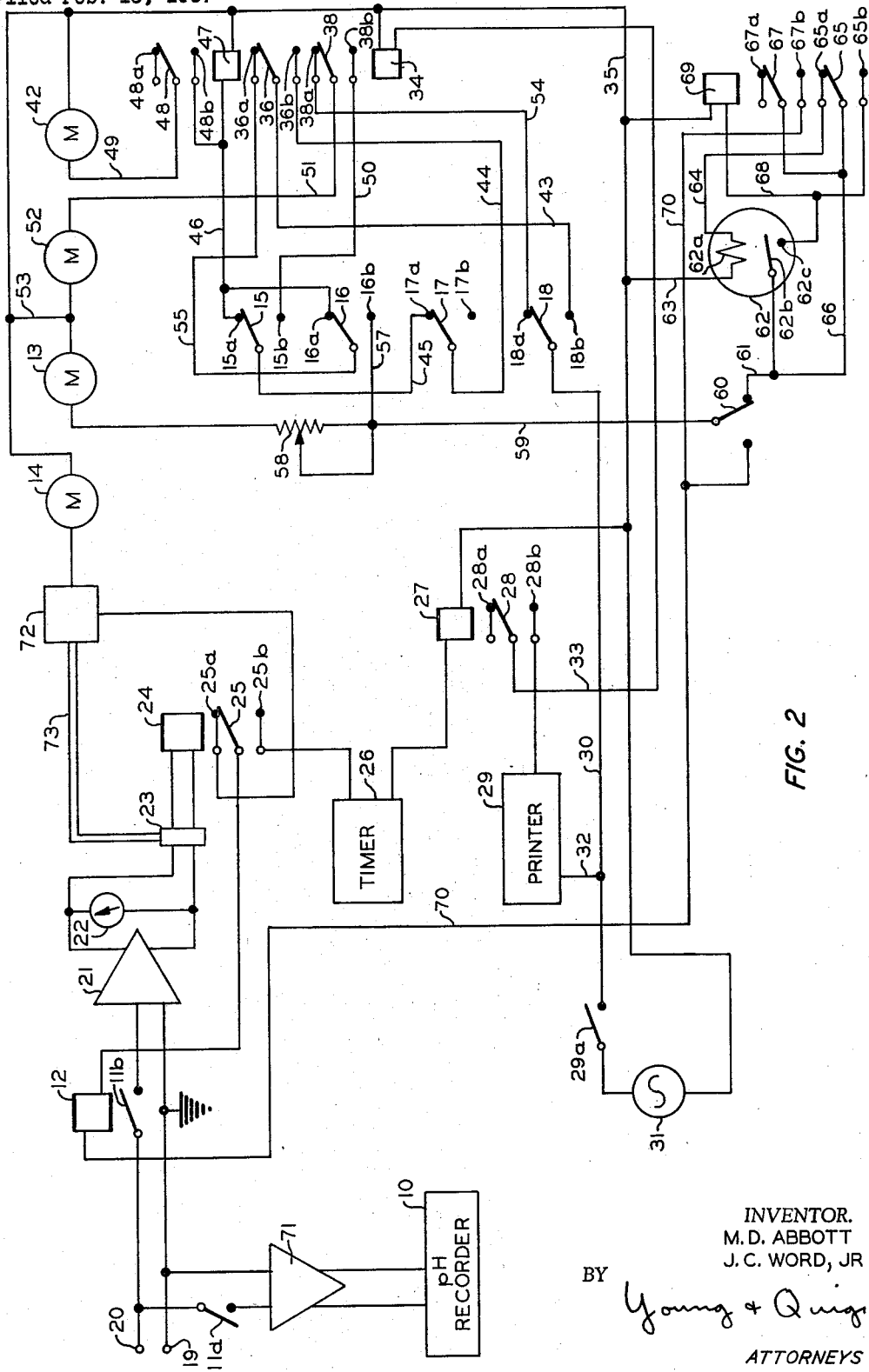

United States Patent Office 3,499,733
Patented Mar. 10, 1970

3,499,733
AUTOMATIC TITRATOR
Merlin D. Abbott and James C. Word, Jr., Phillips, Tex., assignors to Phillips Petroleum Company, a corporation of Delaware
Filed Feb. 13, 1967, Ser. No. 615,644
Int. Cl. G01n 33/00, 31/00; B01k 3/00
U.S. Cl. 23—253
4 Claims

ABSTRACT OF THE DISCLOSURE

An improved circuit for an automatic titrator which provides a time delay between the point when the electrodes are inserted within the reaction cell and the point when the titrant dispensing is begun to provide for an initial pH reading of the solution within the reaction cell.

---

Figure 1:
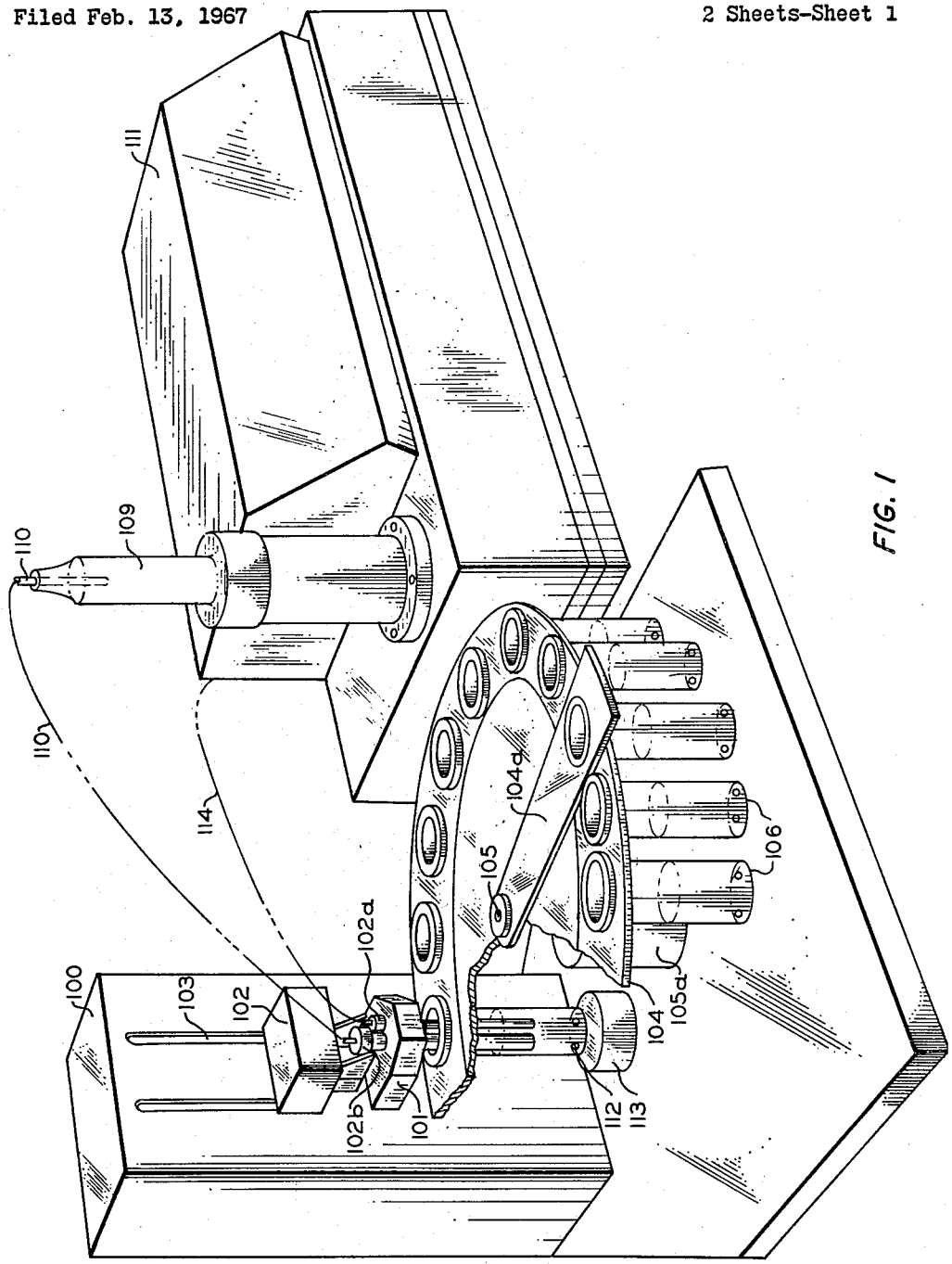

This invention relates to an automatic titrator. In another aspect, this invention relates to an improved pH measuring mechanism for an automatic titrator.

Several titration devices have been developed for carrying out automatic analyses and chemical processes. In a typical automatic titrator, a sample is introduced into a reaction cell to be titrated. Next, the electrodes for measuring the electrical output from the reaction cell are inserted into the cell and the introduction of titrant is simultaneously begun.

The flow of titrant into the reaction cell is controlled by an electric variable speed servo motor or a series of single speed motors. The relative speed of the motor or motors controls flow of titrant. An electrical circuit is disposed between the electrical output of the reaction cell and the motor or motors, which circuit in turn controls the speed of the variable speed servo motor or selects an appropriate single speed motor to control the flow of titrant at a rate proportional to the electric output from the reaction cell which in turn diminishes as the end point of the titration is approached. Finally the circuit shuts off the controlling motor and consequently the flow of titrant when the end point is reached. In this manner, the predetermined end point (pH) of the sample is reached from the known or measured amount of titrant added to the reaction cell. The electrodes measuring the electrical output from the reaction cell can also be attached to a separate device or recording instrument calibrated to read pH. This can be done either with the same electrodes that control the rate of the titrant dispensing motor or motors, or separate electrodes can be placed in the cell solely for the purpose of measuring pH. When this is done, pH can be determined at any time during the titration process.

However, as stated, the electrodes are inserted into the reaction cell simultaneously with the introduction of titrant; therefore, it is impossible to get an initial pH reading on the sample before reaction of the titrant. In many operations, such as the analysis of liquid waste disposal in waterways, it is not only necessary to know the amount of acid consumed per gram of liquid to bring the sample to the desired end point, but it is also necessary to know the initial pH of the sample so that the initial pH of the sample can be compared with the minimum standard of contamination represented by a predetermined pH desired in the disposal area. To avoid unnecessary and tedious calculations, it is desired to get a separate initial pH reading of the sample when using the above-described apparatus.

Therefore, the object of this invention is to provide an improved automatic titrating apparatus that will measure pH before titrant is introduced into the reaction cell.

According to the invention, a time delay circuit is placed between the titrant dispensing motor actuating switch which normally actuates the titrant dispensing motor when the electrodes are placed within the reaction cell and the said titrant dispensing motor. The time delay can be for any desired time increment which will allow the particular sample to stabilize, and initial pH measurement to be made. This delay is normally from 2 to 180 seconds and the preferred delay is of the order of 30 seconds for most samples. This invention eliminates extra sample handling which is normally required to get an initial pH reading and saves operator time in so doing.

This invention can be more easily understood from the study of the disclosed drawings. FIGURE 1 is a schematic illustration of the apparatus of this invention. FIGURE 2 is a circuit diagram for the preferred delay mechanism of this invention.

Now referring to FIGURE 1, elevator 102 slides within grooves 103 in titration base 100. Elevator 102 has probes 102a and 102b extending downwardly therefrom and through apertures in plate 101 into a reaction cell 106 below. Probe 102a has electrodes for measuring electrical output from within the reaction cell and is connected to recorder controller 111 by lead 114. Probe 102b carries the titrant dispenser nozzle thereon and is connected to syringe 109 by conduit 110. Rack 104 rotates around spindle 105 which is operated by a motor contained within protrusion 105a. After each titration, rack 104 rotates until a contactor (not shown in FIGURE 1) strikes the next reaction cell in rack 104 which causes the reactor to stop its rotation. Arm 104a is placed around the last reaction cell and protrudes beyond the periphery of rack 104. This protrusion strikes a contactor from platform 101 (not shown in FIGURE 1) to thereby end the titration cycle.

Stirring beads 112 which are metal particles normally enclosed in a glass shell are placed in each reaction cell. Protrusion 113 contains a stirring motor with a reciprocating magnet panel whose movement causes the beads 112 within the reaction cell to agitate as the reaction cell is passed over protrusion 113 when the stirrer motor is operating.

Thus, in the sequence of operation rack 104 rotates and places a reaction cell 106 over protrusion 113 and under elevator 102. Elevator 102 lowers probes 102a and 102b in the reaction cell and the stirrer motor begins its operation. Also, as soon as the elevator reaches its lower position the titrant motor immediately begins to dispense titrant from the titrant syringe 109. Titration is completed and the amount of titrant dispensed is recorded by recorder controller 111. However, as previously stated, when utilizing this apparatus it is impossible to get an initial pH reading by any pH measuring probes attached to elevator 102 because as soon as the elevator 102 reaches its lowermost position the titrant motor begins dispensing titrant from syringe 109. This invention improves the circuitry of the apparatus as illustrated in FIGURE 1 so that an initial reading of pH can be obtained if desired by probes on elevator 102 before the titrant motor begins dispensing titrant into the reaction cell. The circuitry of this invention will be illustrated in FIGURE 2.

Now referring to FIGURE 2, the circuitry and the operation thereof will be described with reference to the following sequential steps in the titrating operation: during titration; upward movement of the elevator; rotation of the turntables; downward movement of the elevator; delay and reading of initial pH.

DURING TITRATION

At this time switch 29a is closed, the delay circuit of this invention (whose operation will be described below) has been actuated, pH measurement of the original solution has been made by pH recorder 10, switch 11a has been opened and switch 11b has been closed by relay 12, and both stirrer motor 13 and titrant dispensing motor 14 are operating. Under these conditions, the contactor of switch 15 is closed with contact 15a, the contactor of switch 16 is closed with contact 16b, the contactor of switch 17 is closed with contact 17b and the contactor of switch 18 is closed with contact 18b. Switch 17 remains in this position during the entire operation of this device until the last reaction cell is brought into alignment with the elevator, at which time switch 17 is actuated so that the contactor is brought against contact 17b. Switch 17 is actuated by arm 104a as illustrated in FIGURE 1. When the end point is reached, the signal from electrodes 19 and 20 is amplified by amplifier 21 and indicated at meter 22. This same signal is applied to electrometer 23 which is pre-set with the potential which is indicative of the desired end point. This signal also actuates relay 24 which controls switch 25. When switch 25 is thereby actuated the contactor is moved from contact 25a to contact 25b breaking the circuit to titrant dispensing motor 14 and thus stopping the injection of titrant fluid. This in turn will apply current to timer 26. Timer 26 will provide a delay to allow the solution potential in the reaction cell to come to equilibrium. If during the delay the said potential falls below the pre-set potential in electrometer 23 which is indicative of the desired end point, then the resulting signal to relay 24 will cause the contactor of switch 25 to be moved against contact 25a and cause titrant dispensing motor 14 to thereby dispense more titrant. This will also cause timer 26 to be reset. This sequence will occur until the solution potential is stabilized and the signal to relay 24 no longer causes the contactor of switch 25 to move against contact 25a. At this time, timer 26 actuates relay 27 which in turn causes the contactor of switch 28 to move against contact 28b. This completes the circuit to printer 29 and causes the printer 29 to print out the amount of titrant which has been injected by titrant dispensing motor 14. Thus, the titration period for the particular reaction cell is completed.

UPWARD MOVEMENT OF THE ELEVATOR

The closing of the contactor of switch 28 to contact 28b not only supplies power to the printer but connects one side of power source 31 to leads 30, 32, 33 through relay 34 to the other side of power source 31 via lead 35. This actuates relay 34 which in turn closes the contactor of switch 36 against contact 36b, and the contactor of switch 38 against contact 38b. Thus, when the end point is reached switches 36 and 38 move to the opposite position as shown in FIGURE 2. Therefore, power to elevator motor 42 is obtained from lead 30, switch 18 in its downward position against contactor 18b, lead 43, switch 36, lead 44, switch 17 in its upper position, lead 45, switch 15 in its upward position and lead 46 which activates relay 47 which in turn causes the contactor of switch 48 to contact 48b to supply power to motor 42 via lead 49. Then motor 42 will cause the elevator to rise to its uppermost position. When the elevator has reached the uppermost position the contactor of switch 15 moves against contactor 15b and the contactor of switch 16 moves against contactor 16a. The contactor of switch 18 is against contact 18b and thereby allows power to be supplied to turntable motor 52 through the following circuit: from power lead 30 through switch 18 in the downward position, lead 43, through switch 36 in the downward position, lead 44, through switch 17 in the upper position, lead 45, through switch 15 in the downward position, lead 50, through switch 38 in the downward position, lead 51 to turntable motor 52 which is in turn connected to lead 35 via lead 53. As the turntable motor starts to turn, the contactor of switch 18 is placed against contactor 18a and shortly thereafter or simultaneously therewith timer 26 reactuates relay 27 to thereby cause the contactor of switch 28 to move against contact 28a. This in turn removes power from relay 34. The latter action also allows power from lead 30 to flow through switch 18 in its upward position, lead 54, switch 38 which has been moved to its upper position due to the deactivation of relay 34, lead 51 to turntable motor 52. The turntable will continue to move until the next reaction cell strikes a contactor from platform 101 (shown in FIGURE 1) which in turn will move the contactor of switch 18 against contact 18b and thereby remove power of turntable motor 52. The reaction cell position under elevator 102 is now ready for titration period.

DOWNWARD MOVEMENT OF THE ELEVATOR; DELAY AND READING OF INITIAL pH

Continuing the sequence from above, contactor of switch 18 has moved against contact 18b, power flows from lead 30 through switch 18 to lead 43 to switch 36 in its upper position, to lead 55, through switch 16 in its upper position, lead 46 through relay 47 which in turn actuates relay 47 and moves the contactor of switch 48 against contact 48b, to lead 49 and on to elevator motor 42 which is connected to the other side of power by lead 35. This sequence will supply power to elevator motor 42 and cause the elevator to again lower into the respective reaction cell. It must be noted that even though the elevator motor 42 operates in only one direction whether the elevator moves up or down, it is of no significance since the upward and downward movement of the elevator is controlled by reversing cams or gears in a manner not shown. The elevator upon moving the electrodes on the titrant dispensing nozzle down into the reaction cell also moves the contactor of switch 15 against contact 15a and the contactor of switch 16 against contactor 16b. At this instant it can be readily seen that power lead 30 is connected through switch 18 in its lower position, lead 43, through switch 36 in its upper position, lead 55, through switch 16 in its lower position, through lead 57 which connects to rheostat 58 and lead 59. Lead 59 connects to stirrer motor 13 which is in turn connected to power lead 35 via lead 53. Lead 59 also branches downward and connects to switch 60. When switch 60 is in its normal position, contactor for switch 60 will connect to lead 70 which will in turn suppy power to titrant dispensing motor 14. When the contactor of switch 16 is placed in its delay position the time delay mechanism of this invention is thereby connected into the titrant dispensing motor operating circuit.

Thermal time delay switch 62 comprises heating element 62a, temperature sensitive contactor 62b, and contact 62c. Heating element 62a is connected to power lead 35 by lead 63 and to power lead 59 by lead 64, switch 65 in its upper position, lead 66, lead 61, and switch 60. Switches 65 and 67 are spring biased upward and the contactors thereof normally rest on contact points 65a and 67a, respectively. Thus, it can be readily seen that power from lead 59 cannot reach lead 70 which ultimately leads to titrant motor 14 until temperature sensitive contactor 62b is forced against contact 62c which in turn will cause relay 69 to actuate switches 65 and 67 to move to their lower positions and power to flow via lead 68, through switch 65, lead 66, through switch 67 to lead 70. Temperature sensitive contactor 62b will move against contact 62c after a predetermined delay of from about 2 to 180 seconds during which time heating element 62a is heating the inside atmosphere of thermal time delay mechanism 62.

Therefore, during this time delay, electrodes 19 and 20 which have been inserted into the reaction cell are sensing any potential difference therein. Switch 11a is normally in the closed position but is open by the actuation of relay 12. Conversely, switch 11b which is normally open will be closed by the actuation of relay 12. Therefore, until time delay mechanism 62 is actuated there will be no current flowing through relay 12 and switch 11b will remain in a closed position. Thus, potential in the reaction cell is measured by electrodes 19 and 20, amplified by amplifier 71 and recorded by pH recorder 10 at any time that relay 12 is not actuated. However, when relay 12 becomes actuated and power is supplied to titrant dispenser motor 14, switch 11a will open, switch 11b will be closed, and the signals from electrodes 19 and 20 will only be amplified by amplifier 21. This switching out procedure will avoid any overload on the measuring circuit. However, it must be noted that a different pair of electrodes can be used to measure the initial pH. When a different pair of electrodes is used to measure the initial pH, then all four electrodes will merely be placed on the elevator and inserted in the reaction cell as the elevator is moved downward, switches 11a and 11b and relay 12 will be eliminated, and the rest of the circuitry will remain the same.

After the desired time delay temperature sensitive contactor 62b will make contact with contact 62c, relay 69 will be actuated, the contactors 65 and 67 will be moved against contacts 65b and 67b, respectively, and current will flow from lead 59 through the time delay circuit to lead 70, through switch 25 as signals are received.

It must be noted that the contactor of switch 25 was moved back against contact 25a after the electrodes were removed from the reaction cell as the elevator was moved upward; therefore, switch 25 is in the titrant dispensing motor operating position at this time. Thus, after the time delay circuit of this invention is actuated, current flows from lead 59, switch 60, lead 61, thermal timer mechanism 62, lead 68, switches 65 and 67 in their lower position to lead 70. The flow of current through lead 70 will pass through relay 12 and cause switch 11 to open, and on through switch 25 in its upper position to titrant motor speed control mechanism 72 which is connected to electrometer 23 by lead 73, and on to titrant dispensing motor 14. Titrant dispensing motor control mechanism 72 is a simple rheostat mechanism that will control the flow of operating current to titrant dispensing motor 14 as the titration proceeds. Thus, as the end point is reached, the speed of titrant dispensing motor 14 is slowed down by the action of control mechanism 72.

Therefore, it can readily be seen that the use of the time delay mechanism of this invention will allow an initial pH reading to be made on a sample within a respective reaction cell before any titrant is dispensed therein.

We claim:
1. In an automatic titrating apparatus comprising at least one reaction cell; an elevator movable between a first and second position; a titrant dispensing nozzle connected to the elevator means; electrodes connected to the elevator means; an electric drive means connected to the elevator for moving the elevator, the titrant dispensing nozzle and the electrodes between a first position wherein the electrodes and the titrant dispensing nozzle are spaced from the reaction cells and a second position where the electrodes and the titrant dispensing nozzle are introduced into a reaction cell for measuring electrical output from said reaction cell and introducing titrant into said cell, respectively; dispensing means connected to the titrant dispensing nozzle; a titrant dispensing motor connected to the dispensing means for delivering titrant from the dispensing means into the reaction cell; a power source; an actuating switch attached to the titrant dispensing motor and the power source for energizing the titrant dispensing motor in response to arrival of the elevator at the second position; and a switch attached to the electrodes and a power source for actuating the electrodes in response to arrival of the elevator at the second position; the improvements comprising:

a time-delay mechanism attached to the actuating switch and its titrant dispensing motor for delaying the actuation of said titrant dispensing motor for a predetermined time after the elevator reaches the second position, thereby permitting the electrical output of the reaction cell to be measured before titrant is introduced from said dispensing means.

2. The apparatus of claim 1 further comprising a pH recording means for recording the electrical output of said reaction cell; a pH electrical circuit means connecting said electrodes to said pH recording means; electric relay and switching means which disconnects said recording means from said electrodes while the titrant dispensing motor is actuated.

3. Apparatus of claim 1 wherein said time delay mechanism comprises a heat sensitive delay relay actuated by heating element therein, and a magnetic relay for directing current around said heat sensitive relay through the heating element thereof before said heat sensitive relay is actuated, said magnetic relay being triggered when said heat sensitive relay is actuated by said heating element to thereby allow current from said heat sensitive relay to pass therethrough to titrant dispensing motor.

4. Apparatus of claim 3 wherein said time delay mechanism delays electric current from approximately 2 to 180 seconds.

References Cited

UNITED STATES PATENTS

| 2,770,531 | 11/1956 | Hawes et al. | 23—253 XR |
| 2,898,200 | 8/1959 | Karr | 23—253 |
| 2,950,178 | 8/1960 | Halfter et al. | 23—253 |
| 3,157,471 | 11/1964 | Harrison. | |
| 3,267,362 | 8/1966 | Page | 23—253 XR |
| 3,305,468 | 2/1967 | Liesch | 23—253 XR |

MORRIS O. WOLK, Primary Examiner

R. E. SERWIN, Assistant Examiner

U.S. Cl. X.R.

204—195; 324—30